Dec. 22, 1959  F. R. SWANSON ET AL  2,917,977
MACHINE TOOL
Filed May 7, 1957  6 Sheets-Sheet 1

INVENTORS.
Fred R. Swanson.
BY Carl F. Erikson,
Schroeder, Hofgren,
Brady & Wegner, Attys.

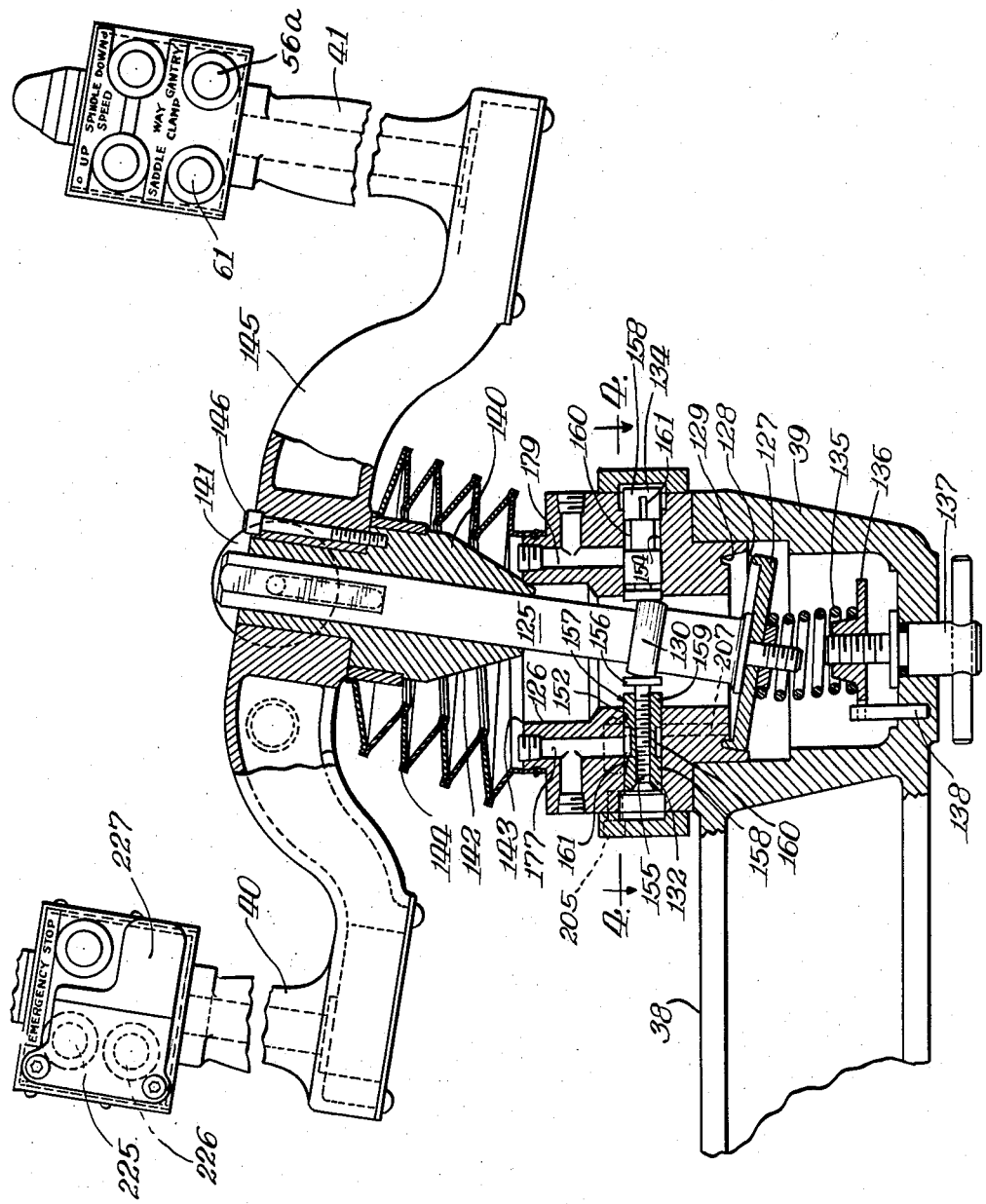

Dec. 22, 1959    F. R. SWANSON ET AL    2,917,977
MACHINE TOOL
Filed May 7, 1957    6 Sheets-Sheet 6
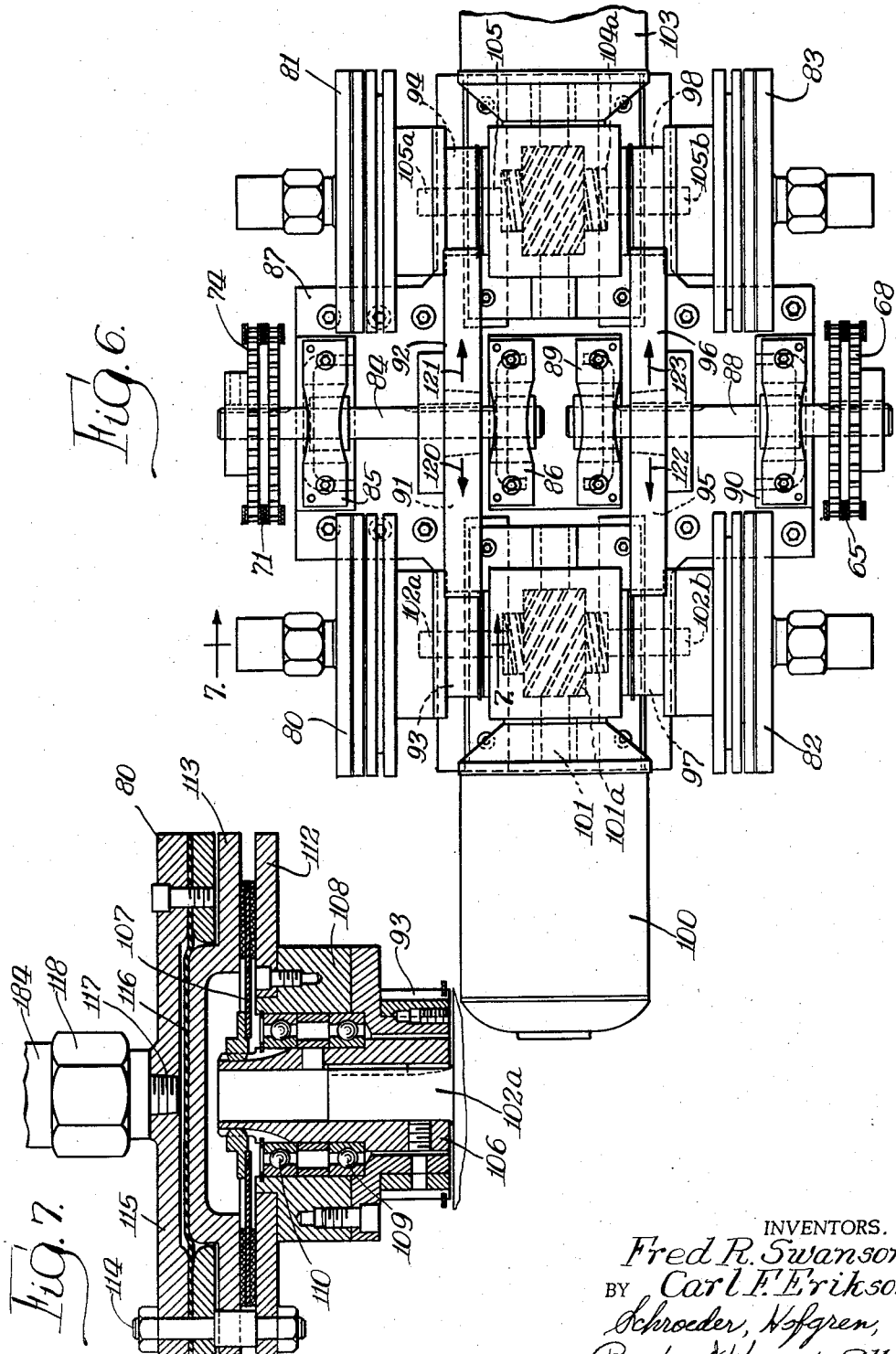
INVENTORS.
Fred R. Swanson
BY Carl F. Erikson,
Schroeder, Hofgren,
Brady and Wegner, Attys.

United States Patent Office 2,917,977
Patented Dec. 22, 1959

2,917,977
MACHINE TOOL

Fred R. Swanson and Carl F. Erikson, Rockford, Ill., assignors to Sundstrand Corporation, a corporation of Illinois Application May 7, 1957, Serial No. 657,533
6 Claims. (Cl. 90—15)

This invention relates to a machine tool, and more particularly to a manually operable router having selectively operable power assist mechanism.

An object of this invention is to provide a new and improved machine tool having a power assist mechanism.

A further object of this invention is to provide a manually operable router having a selectively operable power assist mechanism to assist an operator in operation of the router.

Another object of the invention is to provide a router having a bed provided with a work supporting table, a gantry slidable along the table, a saddle slidably mounted on the gantry above the table for movement transversely thereof, a tool head carried on the saddle and adapted to carry a downwardly extending tool, and control mechanism carried on the saddle including a handle for manually moving the gantry and saddle and selectively operable means for rendering a power assist mechanism operable to exert force on the gantry and saddle in direction and amounts determinable by an operator to urge the tool head in a desired direction.

Another object of the invention is to provide a router, as defined in the preceding paragraph, wherein the control mechanism includes a control rod to which said handle is connected, a housing mounted on the saddle and having a cavity in which the rod is universally movable, means mounting the rod in the housing for universal movement including an adjustable spring mechanism for determining the force needed to move the rod, a plurality of valve members slidably mounted in the housing and lying in a plane intersecting the rod and extending radially of the rod when in a neutral position, there being a pair of valve members for each of the gantry and saddle with one for each direction of movement of the gantry and saddle wherein movement of any of the valve members by tilting of the control rod renders the power assist mechanism operable, the valve members moved and the amount of their movement determining the direction and amount of force applied to the gantry and saddle.

A further object of the invention is to provide a machine tool having a first support, a second support slidable on the first support and adapted to carry a tool, a variable force transmission and control therefor including a first drive shaft operatively connected to said first support, a second drive shaft operatively connected to said second support, a pair of pressure-responsive friction clutches associated with each drive shaft for driving the shaft in opposite directions of rotation, and means for controlling the degree of engagement of said clutches including a valve having a valve member for each clutch, means connecting the valve member to the associated clutch whereby the degree of clutch engagement is proportional to the position of the valve member, and a control member for shifting one or two of the valve members to apply force to one or both of said drive shafts in a direction and amount dependent on the position of the control member.

The objects of the invention generally set forth, together with other ancillary advantages, are attained by the construction and arrangement shown by way of illustration in the accompanying drawing, in which:

Fig. 5 is a vertical section on an enlarged scale through the control mechanism carried on the saddle and showing the relationship between the manually operable handle and the control rod and associated mechanism;

Fig. 6 is an elevation view on an enlarged scale of the power mechanism for providing a power assist to the gantry and saddle and is taken from the rear of the machine and looking toward the left with respect to the machine tool, as shown in Fig. 2;

Fig. 7 is a vertical section taken through one of the drive clutches generally along the line 7—7 in Fig. 6; and Fig. 8 is a top plan view of the mechanism shown in Fig. 6.

Figure 1:
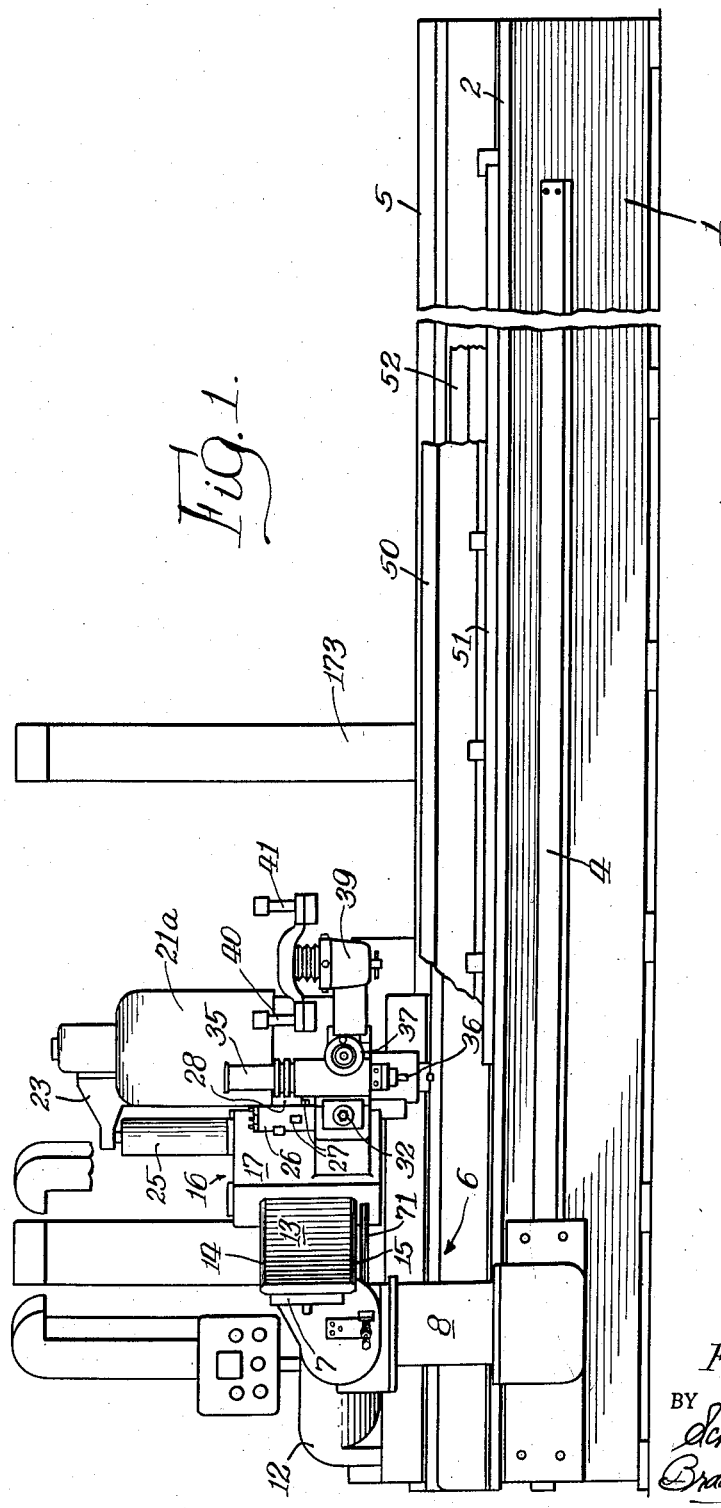
Fig. 1 is a front view in elevation of the machine tool with part of the bed and work supporting table removed and parts of hose connections broken away.
Figure 2:
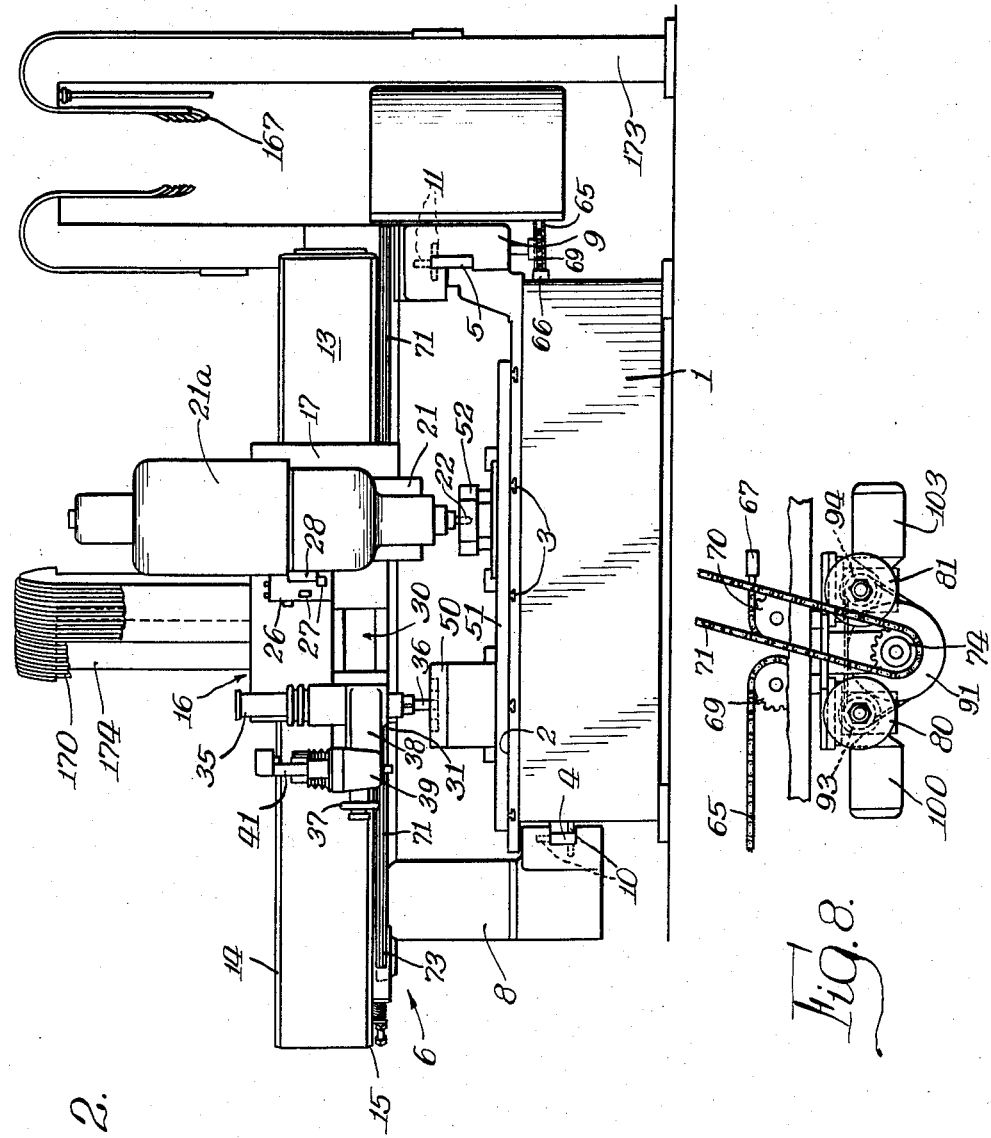
Fig. 2 is an end view in elevation of the machine tool taken from the right side thereof, as viewed in Fig. 1, with parts of hose connections broken away.
Figure 3:
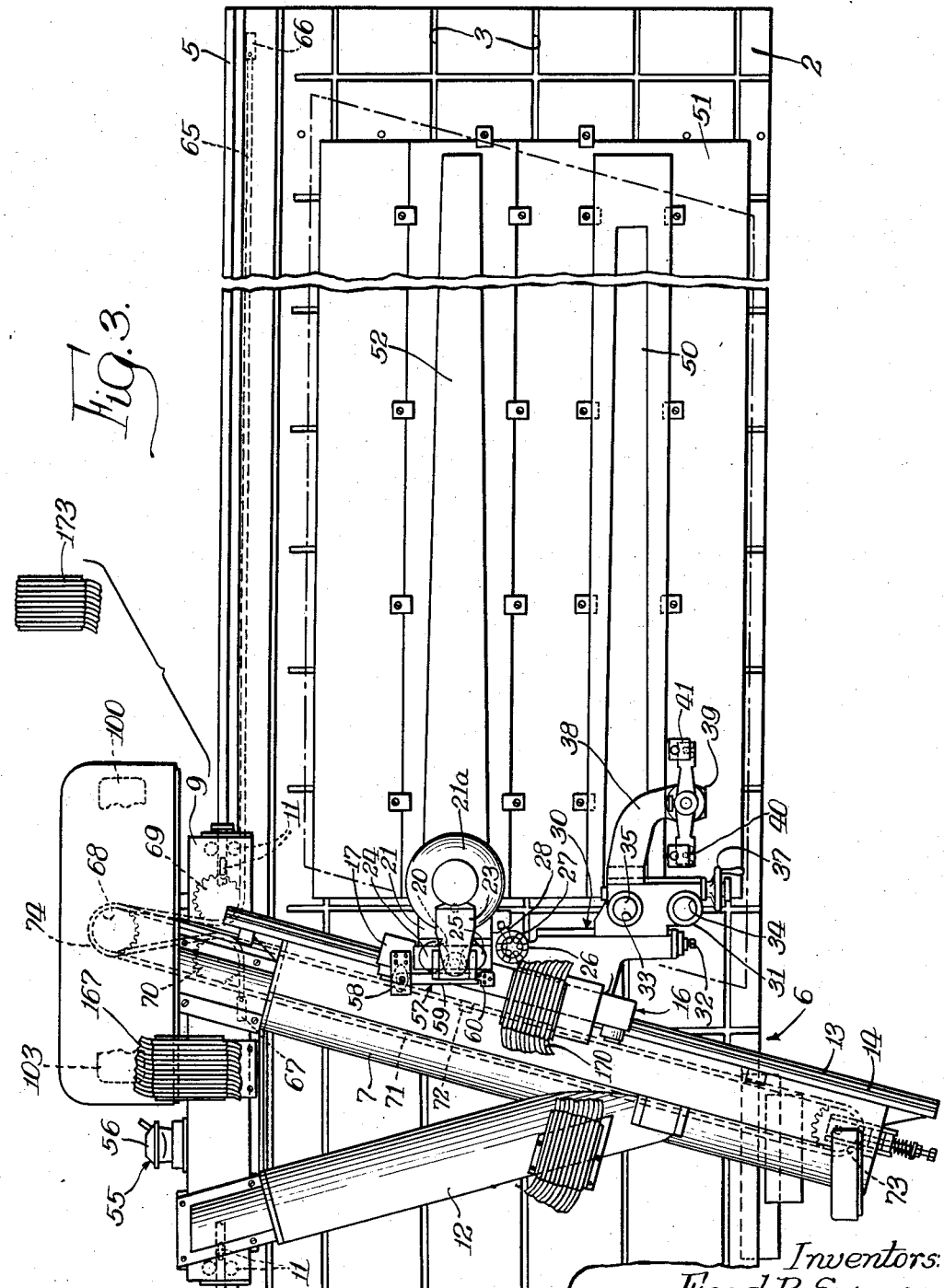
Fig. 3 is a plan view of the machine tool with parts of the bed and work supporting table removed and parts of hose connections broken away.

The machine tool, as shown generally in Figs. 1, 2 and 3, comprises an elongated bed 1 which supports a generally coextensive work supporting table 2 on its top. The table 2 has a series of spaced apart T slots 3 for use in attaching parts later to be described. The bed 1 has a front way 4 and a rear way 5 extending along its length for supporting a gantry indicated generally at 6.

The gantry 6 has a cross part 7 extending generally transversely of the table 2 but at an angle, as shown in Fig. 3, and at one end has a leg 8 extending downwardly alongside the front way 4. The gantry cross part 7 at its rear is connected to a leg 9. The leg is elongated in a direction parallel to the table 2 and generally surrounds the rear way 5 on the bed 1. In order to reduce friction to a minimum and to enable manual movement of the gantry 6 along the table 2, the gantry legs 8 and 9 are provided with rollers 10 and 11, respectively, which rollingly support the gantry on the gantry ways 4 and 5. A brace member 12 connects between the rear gantry leg 9 and the gantry cross part 7 to aid in rigidifying the gantry structure.

The gantry cross part 7 is formed with a flat face 13 having upper and lower saddle ways 14 and 15, respectively, formed along its upper and lower edges. These ways extend above, and entirely across, the width of the table 2 to enable a saddle indicated generally at 16 to be located in any position along the length thereof transversely of the table. A saddle base 17, as shown in Fig. 1, lies in front of the flat face 13 of the gantry cross part 7 and may have rollers (not shown) with suitably beveled faces engaging the upper and lower saddle ways 14 and 15 to rollingly support the saddle 16 on the gantry 6 to enable manual movement of the saddle relative thereto. The saddle base 17 is provided with vertically extending ways 20 for slidably supporting a tool head 21 for movement toward and away from the worktable 2. A motor 21a is mounted on the tool head 21 and a tool, such as a milling cutter 22, is shown extending downwardly from the tool head 21. The tool head has an arm 23 at its top which overlies a pair of vertically extending cylinders. A first cylinder 24 is an air cylinder having air under pressure directed to the underside of a piston therein so as to aid in counterbalancing the weight of the tool head. A second cylinder 25 is a hydraulic cylinder for controlling the up-and-down movement of the tool head. An indexable turret 26, carrying an angularly spaced series of stops 27 at different settable heights, is positioned so as to have one of the stops 27 coact with a stop 28 on the tool head so as to determine the lower position of the tool head.

The saddle base 17 has ways indicated generally at 30 which extend generally horizontally and transversely of the table for adjustably mounting a control head 31. The control head may be adjusted on the ways 30 by a suitable screw shaft, the end of which is shown at 32. The control head 31 has a pair of vertical bores 33 and 34 in either of which a carrier 35 for a template follower 36 may be placed. The carrier 35 may be adjusted vertically within either of the bores by rotation of a hand wheel 37 having a gear (not shown) associated with each of the bores and engageable with a rack (not shown) formed along the length of the carrier. The adjustability of the carrier 35 and the tool head 21 enable the height relationship between the parts to be varied dependent upon the height of template and surface on a workpiece to be cut.

A control arm 38 extends outwardly away from the control head 31. The arm 38 carries control means including a housing 39 and manually operable handles 40 and 41 and other mechanism, as more fully described hereinafter.

The foregoing structure discloses generally a router embodying an elongated worktable along with a gantry may travel with a saddle slidably mounted on a cross part of the gantry above the table for movement transversely of the table. An operator, grasping the handles 40 and 41 carried on the control arm 38, may direct the tool head 21 without tilting the handles in any direction parallel to the worktable 2 as a resultant of movements of the gantry along the table length and the saddle transversely of the table length. In order to guide the cutter 22, a routing collar (not shown) may be placed around the cutter 22, or, as shown in Figs. 1-3, a template follower 36 may be used. A template follower 36 may follow a suitable templae 50 carried on a plate 51 suitably attached to the T slots 3 in the worktable 2. A pattern may be produced in a workpiece 52 corresponding to the pattern of the template 50 by causing the template follower to engage against the contour of the template which produces corresponding movements of the cutter 22. It is believed obvious that the template 50, plate 51, and workpiece 52 may take any desired shape so long as the parts are within the operative area of the template follower 36 and cutter 22 as determined by the longitudinal travel of the gantry 6 and the transverse travel of the saddle 16. The angle of the gantry cross part 7 facilitates visual observation of the cutting operation by an operator as he is holding the handles 40 and 41.

If it is desired to use only one component of movement for the tool head 21, namely, either movement of the gantry or saddle, it is possible to hold either the gantry or saddle against movement. The gantry may be held against movement by means of a clamp indicated generally at 55 which is carried on the rear gantry leg 9 and has an air operated motor 56 for moving clamping members (not shown) into engagement with the rear way 5 on the bed 1 under the control of a button 56a carried on the handle 41. The saddle may be held against movement along the saddle ways 14 and 15 by means of a clamp indicated generally at 57 (Fig. 3) which includes an air motor 58 engageable with a lever 59 pivoted at 60 for pressing a pin (not shown) against the upper way 14 when the air motor is energized under the control of a button 61 on the handle 41.

A drive mechanism for the gantry 6 comprises an elongated member 65, such as a chain, secured at its ends to the rear side of the bed 1 as indicated at 66 and 67, as shown in Fig. 3. The chain 65 intermediate its ends extends around a drive sprocket 68 (Fig. 6) and a pair of idlers 69 and 70, all of which are carried on the gantry.

A drive mechanism for the saddle along the saddle ways includes an endless member 71, such as an endless chain, which is fastened to the saddle base 17 as indicated at 72. The chain 71 extends around a tensioning idler 73 carried at the front end of the gantry cross part 7 and also passes around a drive sprocket 74 (Fig. 6).

The drive sprockets 68 and 74 may be urged to rotate in either direction by a pair of clutches associated with each of the drive sprockets. As shown in Fig. 6, the clutches 80 and 81 are associated with the drive sprocket 74, and a pair of clutches 82 and 83 are associated with the drive sprocket 68. The drive sprocket 74 for the saddle is keyed to a shaft 84 rotatably mounted in bearing blocks 85 and 86 secured to a plate 87 which is fastened to the gantry leg 9. The drive sprocket 68 for the gantry is keyed to a shaft 88 rotatably mounted in bearing blocks 89 and 90 fastened to the plate 87. The sprocket shaft 84 has a toothed pulley 91 of relatively large diameter which is engaged by a toothed belt 92 passing around toothed pulleys 93 and 94 associated with the clutches 80 and 81, respectively. The sprocket shaft 88 has a similar large diameter, toothed pulley 95 around which a toothed belt 96 passes and also around toothed output pulleys 97 and 98 associated with the clutches 82 and 83.

A first drive motor 100 drives a worm shaft 101 engageable with a worm wheel 101a on a drive shaft 102 which extends above and below the worm 101. A second drive motor 103 rotates a worm 104 in a direction opposite to the worm 101 for rotating a worm wheel 104a and a drive shaft 105 extending above and below the worm. The drive shaft 102 has ends 102a and 102b which connect with the input shaft of the clutches 80 and 82, respectively, and the drive shaft 105 has ends 105a and 105b which connect with the input shafts of clutches 81 and 83, respectively. The clutches are identical, and, therefore, a description of the clutch 80, as shown in Fig. 7, is believed sufficient. The end 102a of the drive shaft 102 is keyed to an input shaft 106 which has a clutch plate 107 constituting a drive element keyed thereto. An output shaft 108, to which the toothed pulley 93 is fastened, surrounds the input shaft 106 and is rotatably mounted relative thereto by bearings 109 and 110. The output shaft 108 carries driven elements, one of which is a plate 112, and the other a plate 113 which is mounted for slight, vertical movement so as to be responsive to fluid pressure. The plate 113 is mounted for rotation with the plate 112 by means of a plurality of pins, one of which is shown at 114, which pins also fasten a cover 115 and a diaphragm 116. The cover 115 is provided with a fluid inlet 117, and a coupling 118 connects the rotating clutch with a stationary fluid line 184.

It will be seen from the foregoing that a pair of clutches are associated with each of the drive sprockets 68 and 74, respectively. In each pair of clutches, there is, in effect, a forward clutch and a reverse clutch for applying force to the sprocket shaft in opposite directions. More specifically, the clutch 80 can function, when operative, to move the toothed belt 92 in the direction of arrow 120, while the clutch 81, when operative, would function to move the toothed belt 92 in the direction of arrow 121. Similarly, the clutch 82 would move the belt 96 in the direction of arrow 122, and clutch 83 would move the belt 96 in the direction of arrow 123.

Control means for rendering operable one or two of the clutches 80, 81, 82 and 83 are carried on the control arm 38, previously referred to, and include a control rod 125 which is mounted for universal movement in a cavity 126 provided in the housing 39. The control rod 125 carries a disc 127 at its lower end which has an annular flange 128 which releasably interfits with an annular groove 129 formed in the housing 39. The control rod has a neutral position in which the annular flange 128 would seat along its entire length in the groove 129, the control rod being shown tilted in Fig. 5 away from its neutral position.

The control rod 125 has an annular control flange 130 arranged to be engageable with four, angularly spaced valve members 131, 132, 133 and 134 (Fig. 4) which lie in a plane intersecting the axis of the control rod and radially thereof.

The amount of force required to tilt the control rod 125 may be varied by means of adjusting mechanism including a spring 135. The spring 135 is mounted between the disc 127 and a disc 136 threadably mounted on a rotatable pin 137. A pin 138 mounted in the housing 39 interfits with the disc 136 so as to prevent rotation thereof, and thus the disc 136 may be moved up or down by rotation of the pin 137 so as to vary the compression of the spring 135. Thus the amount of push exerted by an operator before the power assist mechanism comes into operation may be readily varied. The maximum tilt of the control rod 125 may be varied by means of a conical collar 140 which may be placed at different positions axially of the control rod 125 and held in an adjusted position by a fastening member 141. The conical collar 140 has a conical surface 142 which engages a circular edge 143 at the top of the housing cavity 126 to limit the tilt of the control rod 125. The amount of tilting of the control rod determines the maximum power assist provided to the gantry and saddle.

A flexible jacket 144 may enclose the upper end of the housing cavity 126. A handle bar 145 carries the handles 40 and 41 at its ends and intermediate its ends is connected to the conical collar 140 by a bolt 146.

The valve members 131, 132, 133 and 134 are slidably mounted in bores 151, 152, 153 and 154 formed in the housing 39 so as to constitute a control valve. The valve members are identical and each has a stem 155 provided with an end 156 which is engaged by the control flange 130 on the control rod 125. Each valve stem 155 carries a valve spool 157 and has spaced lands 158 and 159 with a groove 160 therebetween. A recess 161 in land 158 has a gradually increasing depth as it approaches the groove portion 160 of the valve member. This recess extends for only a portion of the length of valve land 158, as shown in Fig. 5.

Figure 4:
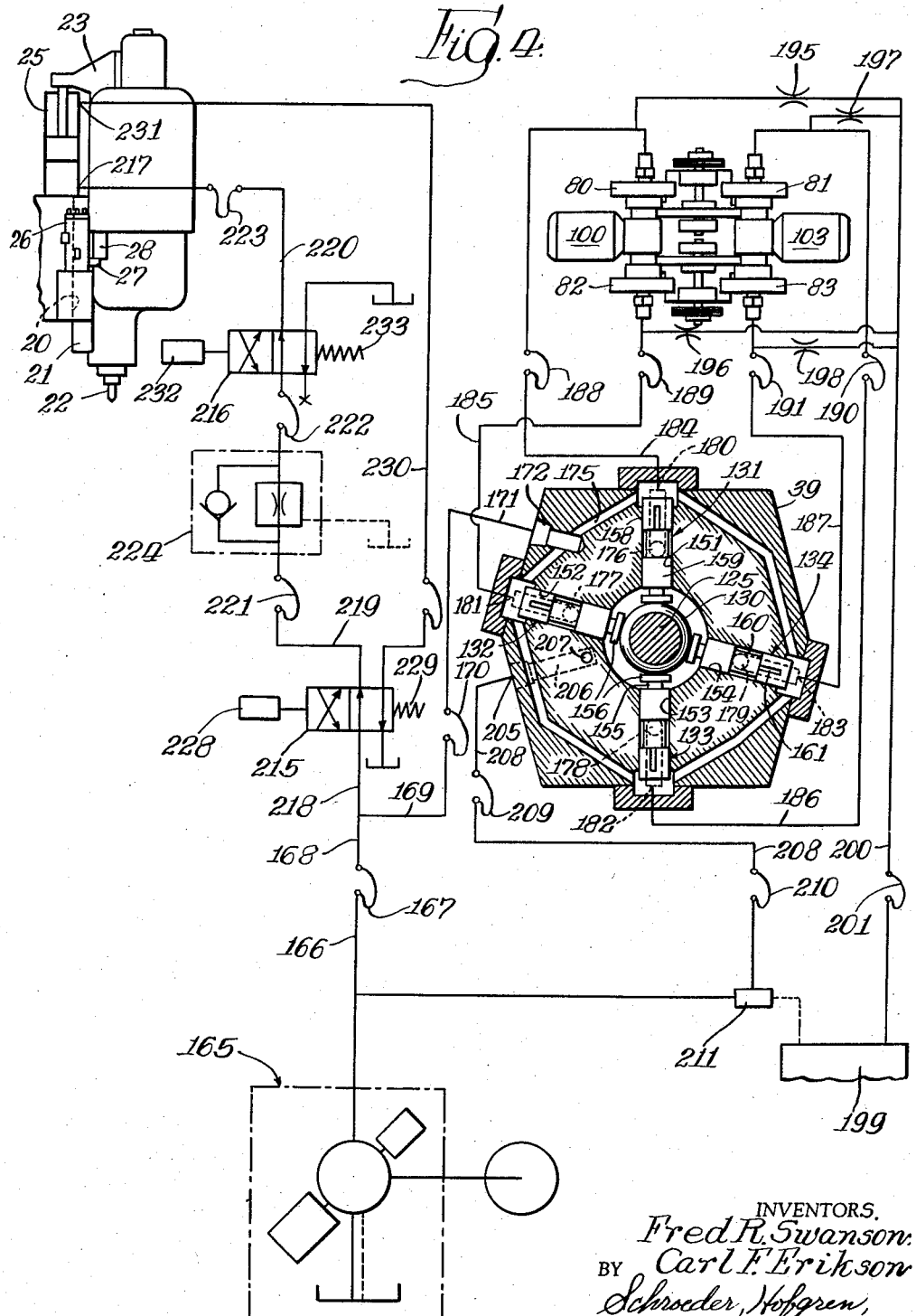
Fig. 4 is a diagrammatic view of the hydraulic circuit for the machine tool including the mechanism associated with the hydraulic components and showing the control valve in section on an enlarged scale and taken generally along the line 4—4 in Fig. 5 with the control rod in a neutral position.

The control valve, including valve members 131, 132, 133 and 134, is shown in section in Fig. 4 in which the valve members 131 and 133 lie on an axis extending normal to the length of the work supporting table 2, and the valve member 131, when operated, causes the saddle 16 to move toward the rear of the worktable 2 in response to a tilting of the control rod 125 in the same direction. The valve member 133 causes the saddle 16 to move toward the front of the worktable 2 in response to a tilting of the control rod 125 in the same direction. The valve members 132 and 134 lie on an axis extending in the same general direction as the length of the work supporting table 2 but at a slight angle thereto. The valve member 132 causes the gantry 6 to move toward the left, as viewed in Fig. 1, in response to tilting of the control rod 125 in the same direction. The valve member 134 causes the application of force to the gantry 6 tending to move the gantry toward the right, as viewed in Fig. 1, in response to tilting of the control rod 125 in the same direction.

As shown in Fig. 4, the alignment of the valves 131, 132, 133 and 134 is such that tilting of the control rod 125 in a plane extending parallel to the length of the work supporting table 2 will result in application of force to the gantry 6 alone, while movement of the control rod in a plane normal to the length of the worktable 2 will result in applying force to the saddle 16 and the application of a lesser force to the gantry 6 by imparting some movement to either of the valve members 132 or 134.

Referring to Figs. 4 and 5, a source of oil under pressure indicated generally at 165 has an outlet line 166 connected to a flexible hose connection 167 which, by lines 168, 169, a flexible connection 170, and line 171, is connected to a pressure inlet port 172 in the control valve housing 39. The flexible hose connections 167 and 170 appear in Figs. 2 and 3 and enable the formation of downwardly extending loops so as to permit the movement of the gantry 6 relative to a station 173 at which the oil source 165 is located. The flexible connection 170 permits movement of the saddle 16 with respect to a hose support 174 carried on the gantry without disrupting the oil connection.

The pressure inlet port 172 communicates with a passage 175 formed in, and generally encircling, the housing 39. The passage 175 communicates with the outer ends of the valve bores 151, 152, 153 and 154 so that oil under pressure is directed inwardly against the outer spool 158 of the valve members 131–134. A discharge passage extends upwardly from each of the valve bores, as indicated at 176, 177, 178 and 179, and they are plugged at their upper ends. The discharge passages have discharge outlets 180, 181, 182 and 183, respectively, each of which, by a line 184, 185, 186 and 187 including flexible hose connections 188, 189, 190 and 191, is connected to the fluid inlets 117 of the clutches 80, 82, 81 and 83, respectively. The flexible hose connections 188–191, inclusive, permit relative movement between the control valve housing 39 carried on the saddle 16 and the power station at which the clutches are located on the gantry 6.

In operation, the gantry 6 and saddle 16 may be manually moved by grasping of the handles 40 and 41 without tilting of the control rod 125. The manual movement of the saddle and gantry is freely permitted by the power mechanism since the clutches 80, 81, 82 and 83 are not engaged unless the handles are tilted. The sprocket shafts 84 and 88 are therefore free to rotate and thus permit movement of the gantry and saddle. Whenever a power assist for one or both of the gantry and saddle is desired, a sufficient force may be applied to the control rod 125 to tilt the rod against the action of the spring 135 in a direction of desired movement for the cutting tool 22. This tilting of the rod will result in shifting either one or two of the valve members 131–134, inclusive, and the shifted valve members will be moved radially outward to cause the groove 161 formed in the valve spool 158 to connect the pressure fluid passage 175 with a discharge passage associated with the shifted valve member. This will create an oil flow through the bore of the shifted valve member, and the rate thereof will depend upon the extent to which the valve member has been shifted because of the varying depth of the recess 161 in the valve land 158. The induced oil flow will result in exerting a pressure on the upper side of the diaphragm 116 in the associated clutch, and this pressure will increase as the oil flow increases. This pressure is created by a plurality of needle valves 195, 196, 197 and 198 in the lines 184–187, inclusive. All of the lines 184–187, inclusive, are connected to a tank 199 by a line 200 including a flexible hose connection 201. It will be seen that the position of the conical collar 140 (Fig. 5) will thus determine the maximum pressure on a diaphragm 116 and thus limit the force output of a clutch.

The shifting of one or two of the valve members 131–134, inclusive, will result in drivingly engaging one or two of the clutches 80–83, inclusive, depending upon which valve members are shifted. This results in the application of force to one or both of the gantry drive sprocket 68 and the saddle drive sprocket 74 to move either the gantry or saddle, or at least exert force on these parts, to urge the cutting tool 22 in the desired direction. This provides a variable force which is applied to the gantry and saddle, and the feed rate of the cutting tool 22 in a cutting operation will depend on the resistance to cut. The power assist mechanism having a variable force output does not attempt to maintain a constant feed rate. There is no tendency to stall as is possible in a feed rate machine so that there is no distortion in the parts of the machine tool.

The control valve housing 39 has its cavity 126 filled with oil up to the level of a drain outlet 205 which connects with the cavity by a lateral passage 206 and a vertical passage 207. The drain outlet 205 is connected to the tank 199 by a line 208, including flexible hose connections 209 and 210, and through a venturi valve 211.

Further as shown in Fig. 4, the tool head 21 is controlled in its raising and lowering movements so as to position the cutter 22 relative to a workpiece by the hydraulic cylinder 25 which has its lower end connected to the pressure line 168 by four-way valves 215 and 216 which are normally urged to a position to connect the line 168 and inlet 217 at the lower end of the cylinder 25 when a cutting operation is not in process. This, with the counterbalance cylinder 24, maintains the head 21 in its upper position. This connection is completed by lines 218, 219 and 220, flexible hose connections 221, 222 and 223, and a flow regulating valve 224. When it is desired to lower the cutting tool 22 for a cutting operation against the action of the counterbalancing cylinder 24 and down to a position against one of the stops 27 on the indexable turret 26, a pair of buttons 225 and 226 carried on the handle 40 and operable by a thumb plate 227 may be depressed which energizes a solenoid 228 associated with the valve 215 so as to shift the valve 215 against a spring 229 to direct pressure through a line 230 to a port 231 at the upper side of the cylinder 25. Continued depression of the buttons 225 and 226 will maintain the stop 28 on the tool head 21 against one of the stops 27 on the indexable turret 26 during a cutting operation. If, during the descent of the tool head and with both buttons 225 and 226 depressed, it is desired to stop the tool head and maintain it in its stopped position, the thumb plate 227 may be released sufficiently so as to release one of the buttons associated therewith, which is shorter than the other, which results in additionally energizing a solenoid 232 associated with the valve 216 to shift the valve against a spring 233 so as to block the lower port 217 of the cylinder 25 with oil under pressure still connected to the cylinder inlet 231. When the tool head 21 is to be raised, the thumb plate 227 may be released which permits the air cylinder 224 to raise the head with an assist from the hydraulic system.

We claim:

1. A power assist router having, in combination, an elongated bed having a stationary work supporting table on the top thereof and a pair of elongated ways on its opposite sides, a gantry having a cross part extending above and generally transverse to the table, a pair of legs extending downwardly from the cross part at the sides of the bed and movable on said ways, and saddle ways extending along the cross part, a saddle movably mounted on the saddle ways for movement transversely of the table and having, a pair of tool head ways extending generally up and down and a pair of generally horizontal control head ways, a tool head movably mounted on the tool head ways for adjustment either toward or away from the table, a control head movably mounted on the control head ways for adjustment transversely of the table, a manual control station on said control head including a handle for manually moving the saddle and gantry, and means for applying a power assist to the gantry and saddle so as to move the tool head relative to the table in a desired direction.

2. A router having, in combination, a bed with a work supporting table, a gantry mounted for movement in a direction paralleling the length of the table and having a saddle way extending transversely above the table, a saddle mounted on the saddle way for movement generally transversely above the table, a tool head carried on the saddle and adapted to carry a downwardly extending tool, a handle on the saddle for manually moving the saddle and gantry to vary the position of the tool head relative to the worktable, means mounting the handle for movement relative to the saddle, power means for urging the gantry and saddle to move relative to the bed, and means operable in response to movement of the handle relative to the saddle for causing the power means to urge the tool in the direction of handle relative movement.

3. A router having, in combination, a bed with a work supporting table, a gantry mounted for movement in a direction paralleling the length of the table and having a saddle way extending transversely above the table, a saddle mounted on the saddle way for movement generally transversely above the table, and selectively operable means for giving a power assist to movement of the saddle and gantry including, a selectively operable drive mechanism for moving the gantry, a selectively operable drive mechanism for moving the saddle and handle operated control means on the saddle for causing operation of one or both of said drive mechanisms.

4. A machine tool having a bed and an elongated work supporting table thereon, a first support mounted on the bed for movement in a direction generally paralleling the length of the table, a second support mounted on the first support above the table for movement in a direction generally transverse of the table, means on the second support adapted to carry a downwardly extending tool, a handle on the second support for manually moving the first and second supports relative to the table, and means selectively operable by the handle for applying power to said first and second supports.

5. A router having, in combination, a bed with a work supporting table, a gantry mounted on the bed for movement in a direction paralleling the length of the table and having a saddle way extending transversely above the table, a saddle movably mounted on the saddle way for movement generally transversely above the table, a tool head carried on the saddle and adapted to carry a downwardly extending tool, a handle on the saddle for manually moving the saddle and gantry to vary the position of the tool head relative to the worktable, and selectively operable means providing a power assist to the movement of the saddle and gantry.

6. A router having, in combination, an elongated bed having a stationary work supporting table on the top thereof and a pair of elongated ways on its opposite sides, a gantry having a cross part extending above and generally transverse to the table, a pair of legs extending downwardly from the cross part at the sides of the bed and movable on said ways, and saddle ways extending along the cross part, a saddle movably mounted on the saddle ways for movement transversely of the table, an elongated chain length extending along and secured at its ends to the bed, an endless chain connected to the saddle, a selectively driven sprocket mounted on the gantry and engageable with the chain length for causing movement of the gantry relative to the chain length and said bed, and a second selectively driven sprocket on the gantry engageable with said endless chain for moving the saddle relative to the gantry.

References Cited in the file of this patent

UNITED STATES PATENTS

| | | |
|---|---|---|
| 2,424,031 | Heer | July 15, 1947 |
| 2,470,103 | Lochman | May 17, 1949 |
| 2,472,273 | Bates | June 7, 1949 |
| 2,599,632 | Hindmarch | June 10, 1952 |
| 2,610,688 | Overman | Sept. 16, 1952 |
| 2,619,847 | Hosea | Dec. 2, 1952 |
| 2,644,370 | Armitage | July 7, 1953 |
| 2,723,598 | Mann | Nov. 15, 1955 |
| 2,788,718 | Martellotti | Apr. 16, 1957 |